Figure 1:
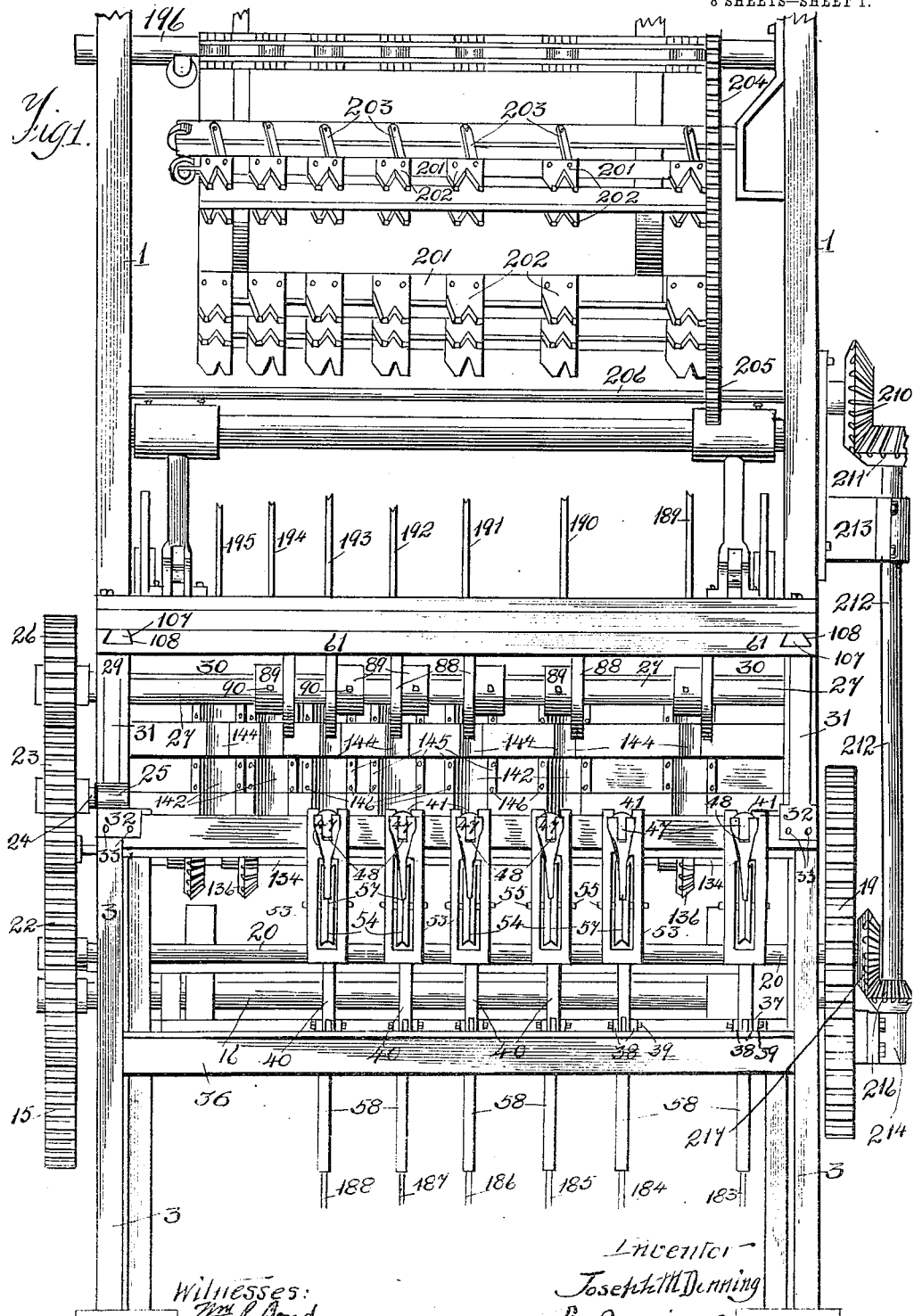

No. 816,538. PATENTED MAR. 27, 1906.
J. M. DENNING.
WIRE FENCE MAKING MACHINE.
APPLICATION FILED MAY 26, 1905.

8 SHEETS—SHEET 1.

No. 816,538. PATENTED MAR. 27, 1906.
J. M. DENNING.
WIRE FENCE MAKING MACHINE.
APPLICATION FILED MAY 26, 1905.

8 SHEETS—SHEET 2.

Witnesses:
Inventor:
Joseph M. Denning,
By Banning & Banning
Attys.

No. 816,538. PATENTED MAR. 27, 1906.
J. M. DENNING.
WIRE FENCE MAKING MACHINE.
APPLICATION FILED MAY 26, 1905.

8 SHEETS—SHEET 3.

Witnesses:
Wm. P. Bond
Walker Banning

Inventor
Joseph M. Denning
By Banning & Banning
Attys.

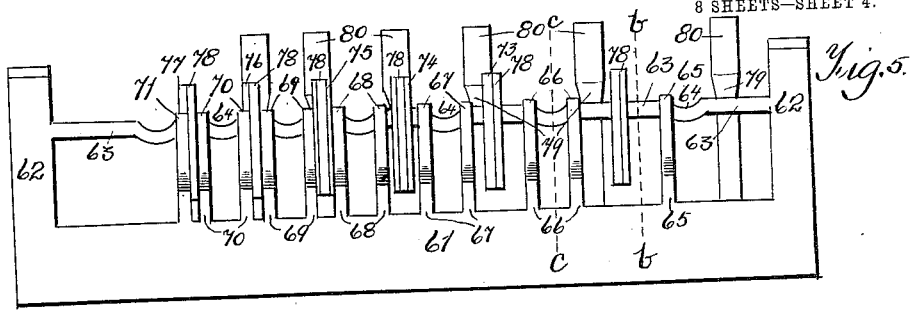
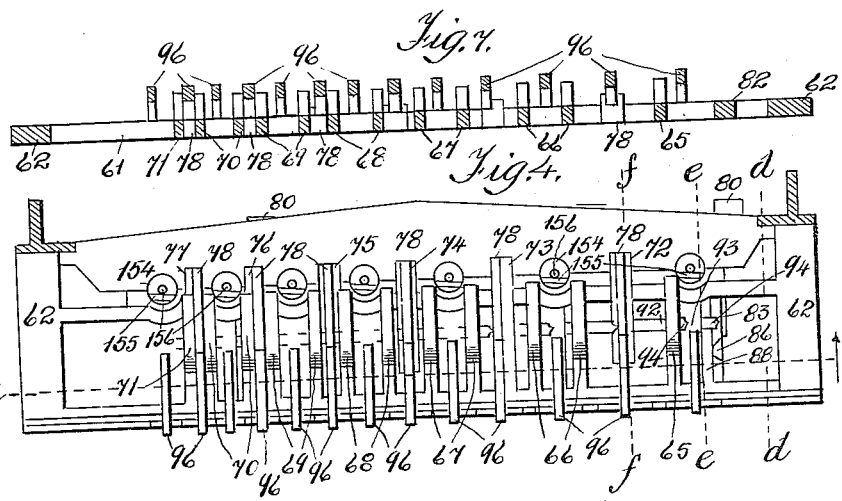
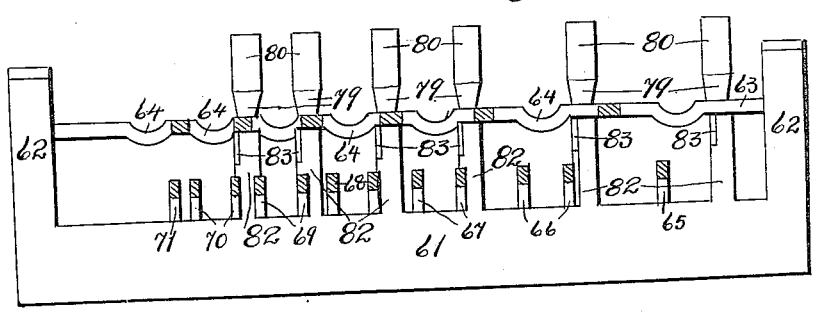
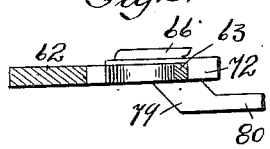

No. 816,538. PATENTED MAR. 27, 1906.
J. M. DENNING.
WIRE FENCE MAKING MACHINE.
APPLICATION FILED MAY 26, 1905.

8 SHEETS—SHEET 5.

Witnesses:
Wm P. Bond
Walker Banning

Inventor
Joseph M. Denning
By Banning & Banning
Attys.

No. 816,538. PATENTED MAR. 27, 1906.
J. M. DENNING.
WIRE FENCE MAKING MACHINE.
APPLICATION FILED MAY 26, 1905.
8 SHEETS—SHEET 6.
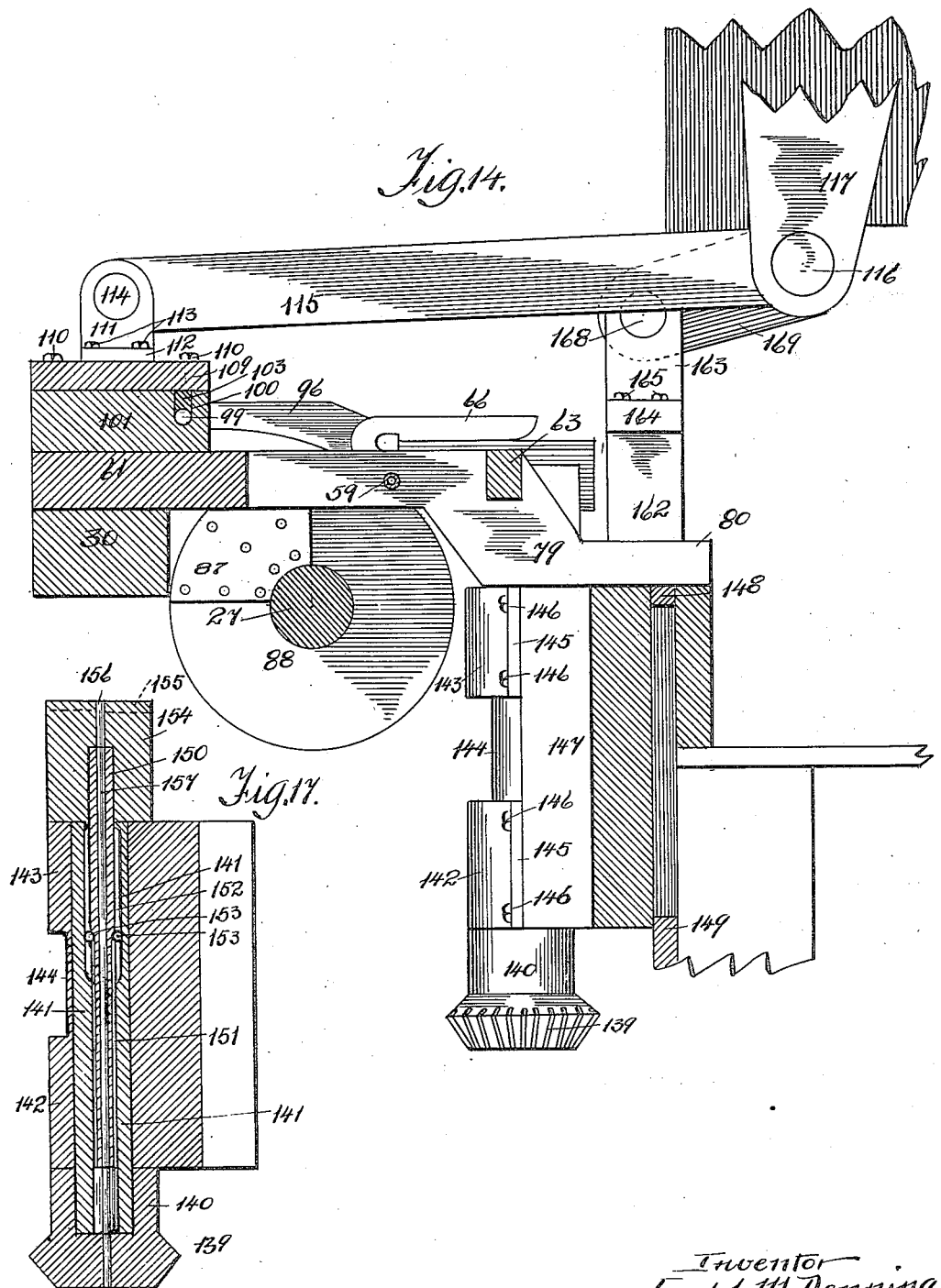

No. 816,538. PATENTED MAR. 27, 1906.
J. M. DENNING.
WIRE FENCE MAKING MACHINE.
APPLICATION FILED MAY 26, 1905.
8 SHEETS—SHEET 7.
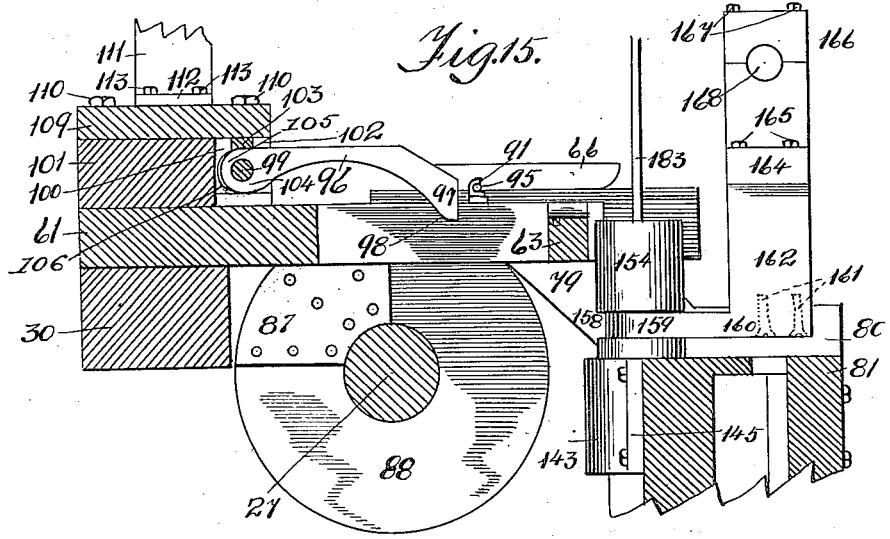
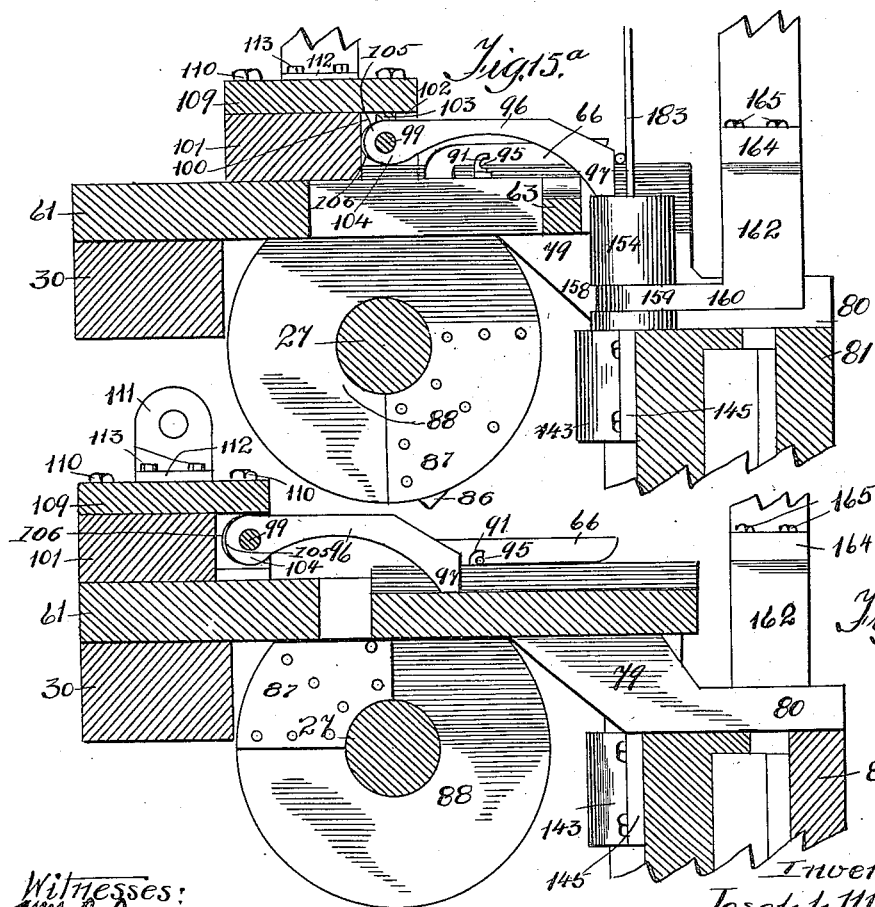

No. 816,538. PATENTED MAR. 27, 1906.
J. M. DENNING.
WIRE FENCE MAKING MACHINE.
APPLICATION FILED MAY 26, 1905.
8 SHEETS—SHEET 8.
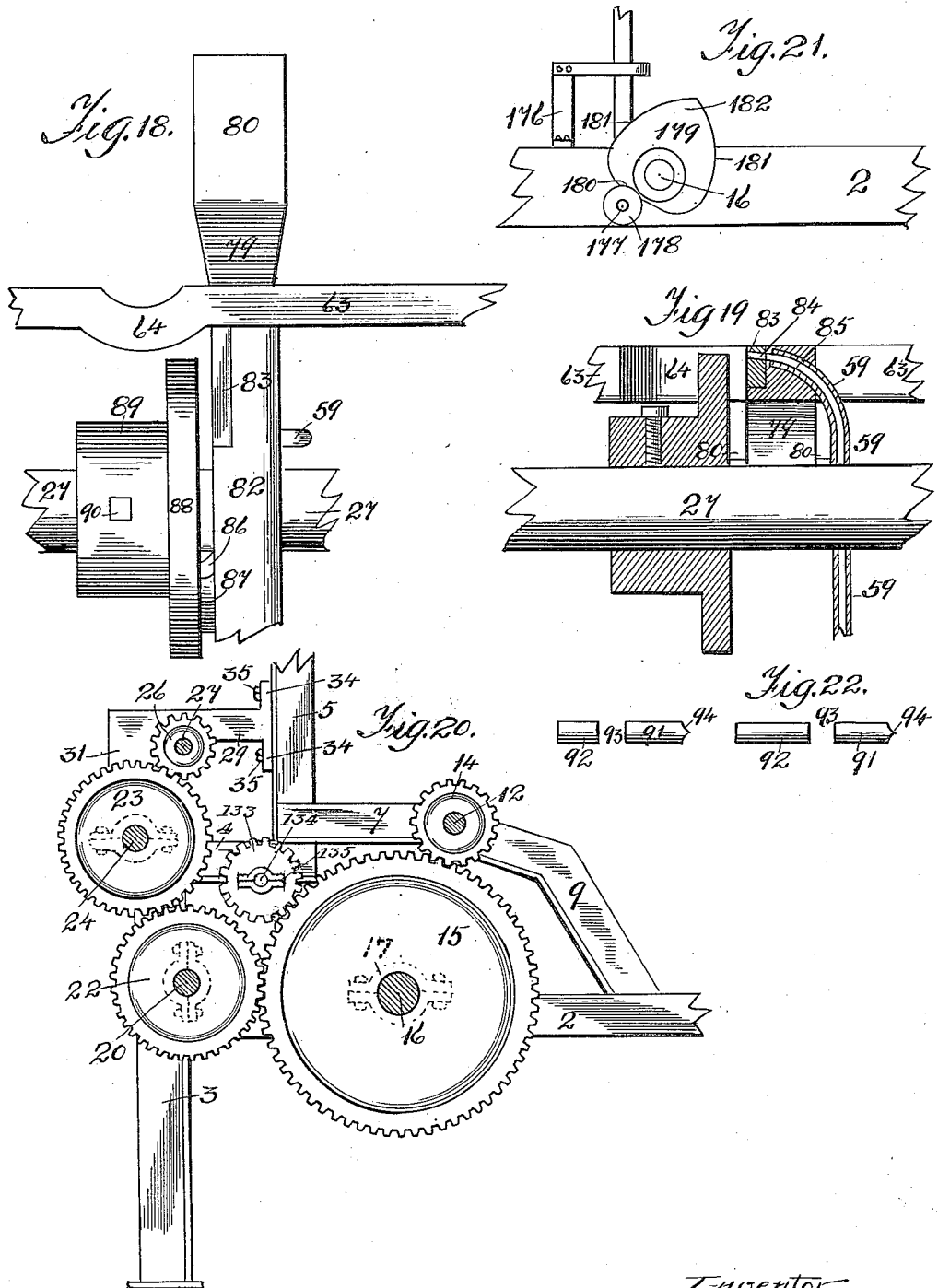

UNITED STATES PATENT OFFICE.

JOSEPH M. DENNING, OF CEDAR RAPIDS, IOWA.

WIRE-FENCE-MAKING MACHINE.

No. 816,538.     Specification of Letters Patent.    Patented March 27, 1906.

Application filed May 26, 1905. Serial No. 262,446.

*To all whom it may concern:*

Be it known that I, JOSEPH M. DENNING, a citizen of the United States, residing at Cedar Rapids, county of Linn, and State of Iowa, have invented certain useful Improvements in Machines for Making Wire Fences, of which the following is a specification.

The machine of the present invention is intended for use in making that type of wire fences in which the longitudinal or strand wires are tied together by sectional stay-wires, with the sections of the stay-wire coiled at their ends around the strand-wires and also having their ends coiled together, so as to form, in effect, a continuous stay-wire extending from the upper to the lower strand-wire and united to the intermediate strand-wires.

The objects of the invention are to construct a machine the several elements of which will operate and automatically and continuously advance the strand-wires and apply the stay-wires without any intermission or stoppage in the advance of the strand-wires; to enable the mechanism for feeding the strand-wires forward and the mechanism for feeding the stay-wires forward to both operate continuously; to sever the sections for the stay-wire, carry the sections forward, and deliver the sections into position for the operation of the twisters or coilers by which the ends of the stay-wire sections are coiled around the strand-wires while the strand-wires are advancing or being fed forward; to feed the stay-wires continuously forward and into position for the severing of the sections which complete a continuous stay-wire and cause the several sections to be carried forward and delivered into position for the operation of the twisters or coilers, and this without any intermission in the operation of the mechanism for feeding the stay-wires forward while cutting off the sections and delivering the sections into position; to automatically control the operation of the mechanism for feeding forward the stay-wires, severing the stay-wire sections, carrying the sections forward, and delivering the sections into position for the twisters or coilers without any interruption in the forward feeding of the longitudinal or strand wires; to enable the advance portion of each stay-wire to be cut off or severed and of the proper length to furnish a section extending between adjacent strand-wires with the ends of the stay-wire section overlapping the strand-wires when the stay-wire sections have been delivered to position for their ends to be operated on by the twisters or coilers; to have the twisters or coilers advance coincidingly with the advance of the strand-wires and in such advance commence and complete the twisting or coiling of the ends of the stay-wire sections around the longitudinal or strand wires; to operate the several mechanisms by which the longitudinal strand-wires are fed forward or advanced, the twisters or coilers actuated, the stay-wires are fed forward or advanced, and the sections of the stay-wires severed and when severed carried forward and delivered into position for the operation of the twisters or coilers all from a common main driving-shaft by which the several mechanisms are continuously operated or driven as required; to cause the stay-wires to be severed, carried forward, and delivered during the period in which the twisters or coilers are moving from normal position, completing the operation of twisting or coiling the ends of the stay-wire sections around the longitudinal or stand wires and returning to normal position; to cause a new section or division of each stay-wire to be advanced into position for severing and to be carried forward and delivered during the period in which the twisters or coilers are advancing with the strand-wires to complete the twisting or coiling of the ends of the preceding stay-wire sections around the longitudinal or strand wires and returning to normal position; to improve the construction and operation of the mechanism by which the stay-wire sections are severed, carried forward, and delivered; to improve the construction and operation of the twisters or coilers by which the ends of the stay-wire sections are twisted or coiled around the longitudinal or strand wires, and to improve generally the construction, arrangement, and operation of the various mechanisms which enter into the machine as a whole as regards the correlation of the various mechanisms in making the fence.

The invention consists in the features of construction and combinations of parts hereinafter described and claimed.

Figure 2:
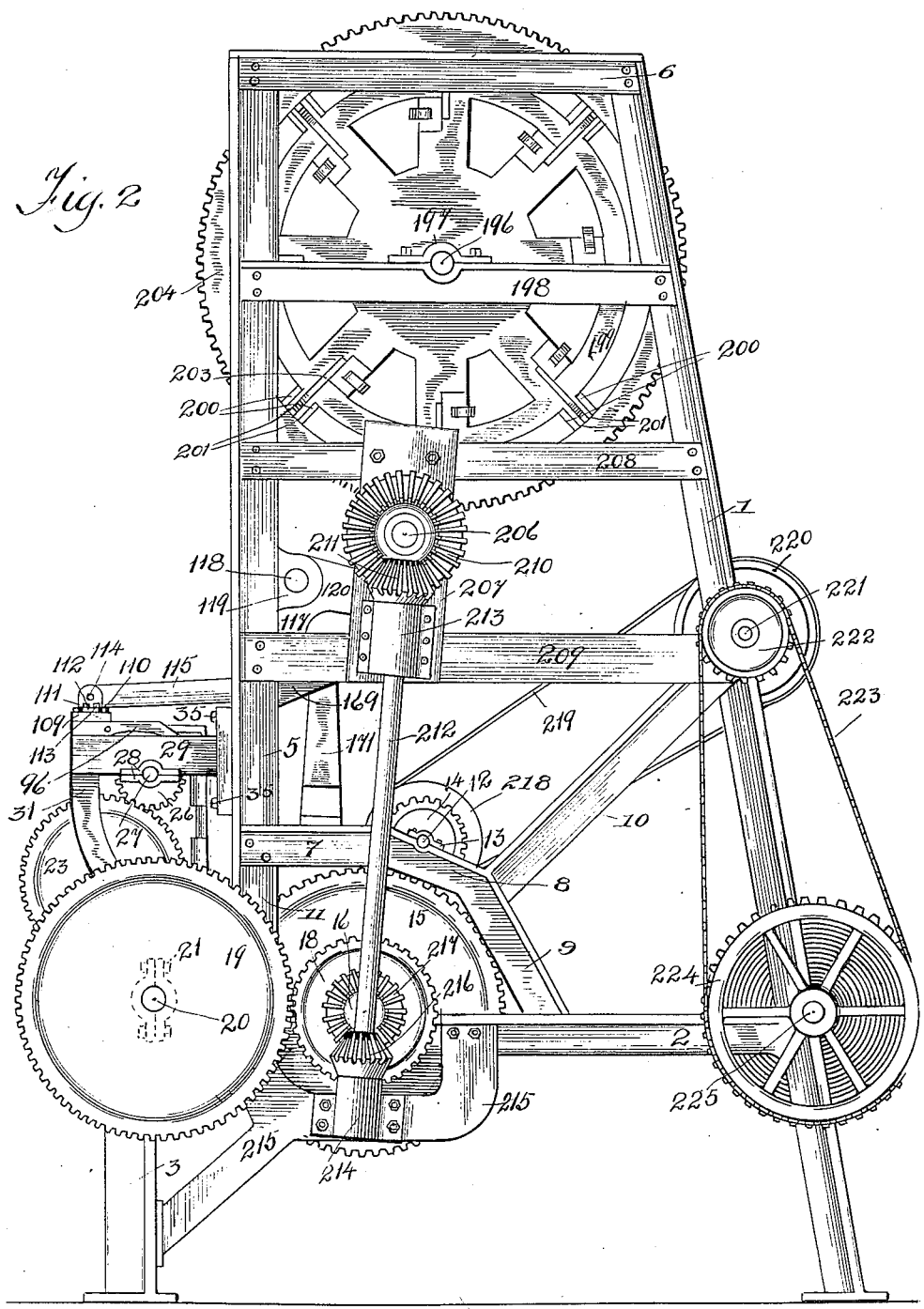
Figure 3:
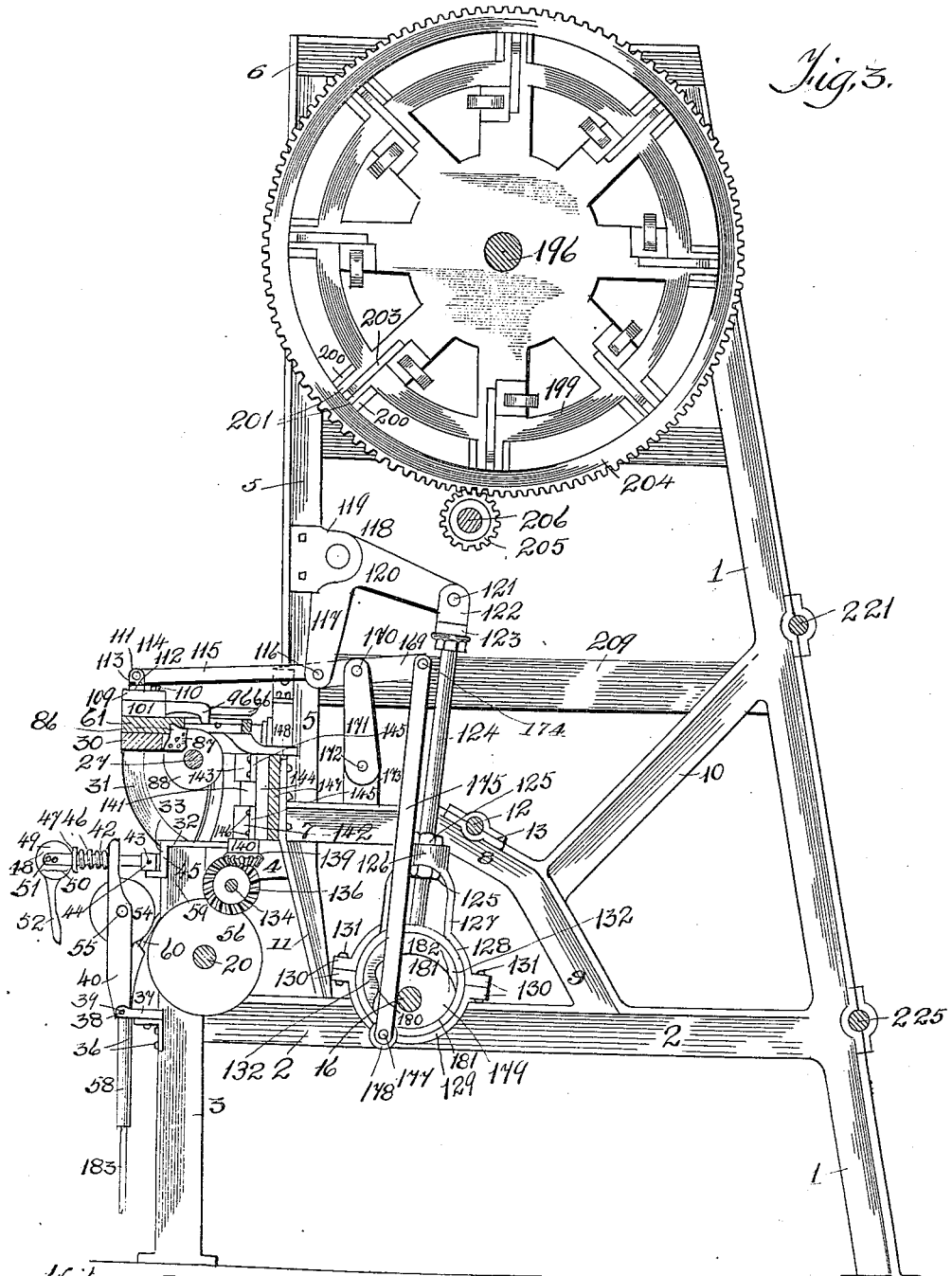
Figure 10:
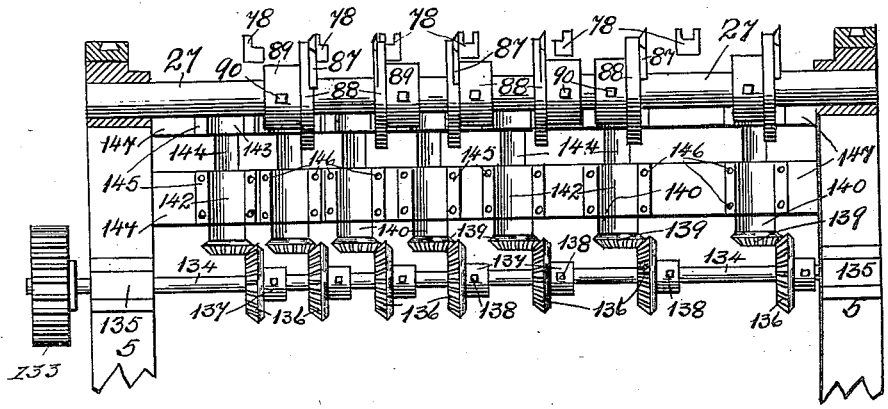
Figure 11:
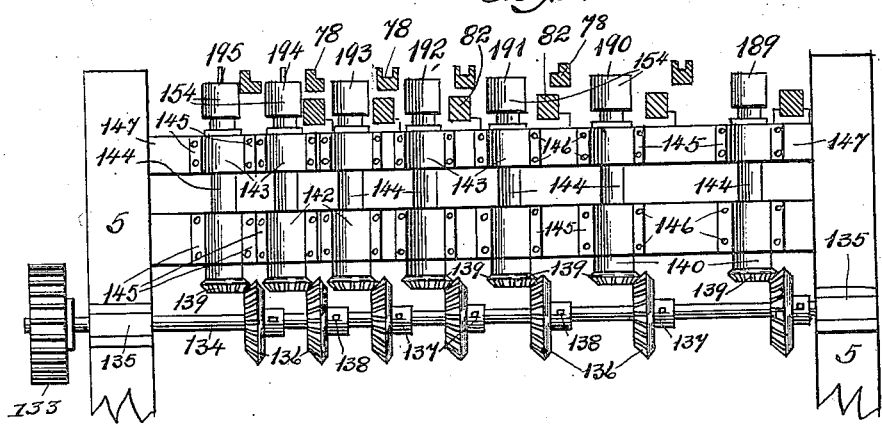
Figure 12:
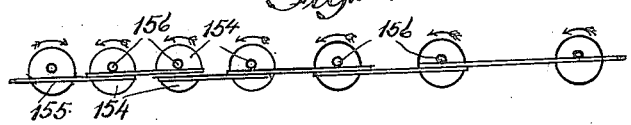
Figure 13:
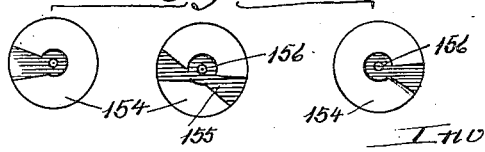

In the drawings, Figure 1 is a front elevation of the machine of the invention with the carrying-reel for advancing the longitudinal or strand wires and the complete fence, partly broken away; Fig. 2, a side elevation of the machine of the invention, showing the right-hand side thereof; Fig. 3, an elevation in section, taken just within the frame on the right-hand side of the machine in Fig. 1. Figs. 2 and 3 are on a smaller scale than Fig. 1; Fig. 4, a top or plan view of the front of the machine, showing the arrangement of the revolving cutters, the retaining fingers or guides for the stay-wires, and the plungers or pushers for carrying the stay-wire sections into position for the operation of the twisters or coilers and showing also an end or face view of the twisters or coilers; Fig. 5, a top or plan view of the plate having the fingers or guides for the sections of the stay-wires; Fig. 6, a similar view to Fig. 5 with the upper fingers or guides removed; Fig. 7, a longitudinal section on line $a\ a$ of Fig. 4 looking in the direction of the arrow, with the revolving cutters removed; Fig. 8, a detail in cross-section on line $b\ b$ of Fig. 5; Fig. 9, a detail in cross-section on line $c\ c$ of Fig. 5; Fig. 10, an elevation of a portion of the front of the machine, showing the revolving cutters, the fixed cutters, the fingers or guides for the sections of the stay-wire, and the bearings and pinions for supporting and revolving the twisters or coilers; Fig. 11, a similar view to Fig. 10 with the revolving cutters removed. Figs. 4, 5, 6, 7, 8, 9, 10, and 11 are on the same scale as Fig. 1; Fig. 12, an end view of the twisters with the stay-wire sections in position for coiling their ends around the strand-wires; Fig. 13, an end view of a twister-head; Fig. 14, a detail in cross-section taken on line $d\ d$ of Fig. 4; Fig. 15, a detail, partly in section, taken on line $e\ e$ of Fig. 4; Fig. 15$^a$, a similar view to Fig. 15, showing the stay-wire plunger in its advance position; Fig. 16, a detail, partly in section, taken on line $f\ f$ of Fig. 4; Fig. 17, a sectional elevation showing the construction of a twister or coiler; Fig. 18, a detail in plan showing one of the revolving cutters and a fixed cutter; Fig. 19, a detail in section showing a revolving cutter and a fixed cutter; Fig. 20, a detail showing the arrangement of the driving-gear for the revolving cutters and the twisters or coilers; Fig. 21, a detail of the cam for raising and lowering the twister or coiler heads; Fig. 22, a detail in plan showing the retaining-tubes for the stay-wire sections.

The machine in the form shown has two side frames, each consisting of a rear standard 1, a cross-rail 2, extending from the rear standard to a front standard 3, a cross bar or rail 4, extending inwardly from the upper end of the front standard 3, a vertical standard 5, extending upwardly at the front from the cross bar or rail 4, and a top bar or rail 6, joining the upper ends of the rear standard 1 and the front standard 5, and these bars for each side frame of the machine can be cast integral or be made separate and united and joined together in any suitable manner. Each side frame has an inwardly-extending bar or rail 7 from each front standard 5, joined to which and continuing as a part thereof is an inclined bar or rail 8, which is continued on a different incline to form a bar or rail 9, joined to the cross bar or rail 2, intermediate of the front and rear standards, and extending up from the inclined bar or rail 9 to the rear standard 1 is an inclined bar or rail 10, and extending down from the inner end of the bar or rail 4 is an upright 11, joined to the cross bar or rail 2, and these several bars or rails furnish a bracing for supporting the several shafts and mechanisms of the machine.

A driving-shaft 12 is mounted in suitable journal boxes or bearings 13 on the rails or bars 8, and on the end of this shaft 12 outside of the frame is a driving-pinion 14, meshing with a gear-wheel 15 on a shaft 16, supported in suitable journal boxes or bearings 17 on the cross rails or bars 2 of the side frames. (Shown by dotted lines in Fig. 20.) The shaft 16 has thereon a pinion 18, which meshes with a gear-wheel 19 on a shaft 20, supported in suitable journal-boxes 21 on the front standards 3 of the framework of the machine, so that from the shaft 12 the shafts 16 and 20 are driven.

The shaft 20 has mounted thereon a gear-wheel 22, which meshes with an idler gear-wheel 23, mounted on a stud-shaft or trunnion 24, extending out from a socket 25, supported on the top rail or bar 4 of the side frame. The idler gear-wheel 23 meshes with a gear-wheel 26, fixed on a shaft 27, supported in suitable journal boxes or bearings 28 on end bars 29, one extending out from each upright or standard 5 of each side frame. The end bars 29 are connected together by a cross-bar 30, and each end bar is supported by a brace 31, extending up from a bracket 32, attached to the corner of the upright 3 and cross-rail 4 by bolts 33, one of the brackets having the socket 25 for the stud-shaft or trunnion 24 in the arrangement shown. The end bars 29 each at its inner end has ears or plates 34, by means of which and suitable bolts 35 the end bars are attached to the uprights 5 of the framework.

An angle-iron 36 extends between the end standards 3, and its vertical portion is entered into a recess in each end standard and secured therein by bolts or otherwise. The horizontal portion of the angle-iron 36 has secured thereto by bolts or otherwise a plurality of bars 37, each bar at its outer end having a tenon or ear 38, on which is mounted by a pin or pivot 39 the lower end of a swinging arm 40, such end of the arm having a slot to receive the tenon or ear. The upper end of each swinging arm 40 has a slot 41 for the passage of a stem 42, the inner end of which is secured by a pin or pivot 43 to a supporting-block 44 on an angle-iron 45 between the uprights or standards 3 of the framework, with the angle-iron entered at its ends into a recess of each standard and secured in place by bolts or otherwise. A coiled spring 46 encircles the forward portion of each stem 42, which spring is located between a washer 47 on the stem and the face of the upper end of the swinging arm 40, so as to exert a pressure that will tend to force the upper end of the arm inward under a yielding resistance furnished by the spring. The outer end of each stem 42 is entered into the slot 48 of a cam 49, having an acting or bearing face 50, which presses against the washer 47 and by which the resistance of the spring is properly regulated. The cam 49 is mounted eccentrically on a pin or pivot 51, passing through the end of the stem 42 and the disk or cam, and each disk or cam has a handle or lever 52, by which it can be turned on its pin or pivot to cause the acting face 50 to bear with more or less force against the washer. Each swinging arm 40 has a slot 53, in which is located a friction-wheel 54, mounted on a journal or trunnion 55, supported in the swinging arm, and each friction-wheel 54 coöperates with a friction-wheel 56, fixed on the shaft 20 and revolving with the shaft. Each friction-wheel 54 and 56 has a groove 57 for the passage of a stay-wire, and each stay-wire is led up to the pair of friction-wheels by a tube 58, and leading from each pair of friction-wheels is a tube 59, the upper end of which terminates as hereinafter described, and between the adjoining ends of the tubes 58 and 59 is an opening or space 60, so that the friction-wheels can grasp or impinge the stay-wire and feed such wire through the tubes for delivery to the cutting mechanism.

A frame is mounted on the end bars 29 and cross-bar 30, and this frame is formed of a front cross-bar 61, end bars 62, and a rear cross-bar 63, having semicircular portions 64, one semicircular portion for each twister or coiler head. A plurality of fingers or guides extend from the inner edge of the front cross-bar 61 and overlie at their inner ends the rear cross-bar 63, as shown in Figs. 4 and 5. These upper fingers or guides are arranged in correlation to the twister-head, so that a finger or guide 65 will be adjacent to the right-hand twister or coiler head, a pair of fingers or guides 66 will be one on each side of the second twister or coiler head, a pair of fingers or guides 67 will be one on each side of the third twister or coiler head, a pair of fingers or guides 68 will be one on each side of the fourth twister or coiler head, a pair of fingers or guides 69 will be one on each side of the fifth twister or coiler head, a pair of fingers or guides 70 will be one on each side or the sixth twister or coiler head, and a single finger or guide 71 will be adjacent to the inside of the seventh twister or coiler head. It will be understood that this arrangement of fingers or guides is applicable to a machine for making a wire fence having seven longitudinal or strand wires and that the arrangement can be changed as required for the number of twister or coiler heads employed, the number of twister or coiler heads corresponding to the number of longitudinal or strand wires of which the fence is composed, and the arrangement in any case should be one having a single finger on the inside of the two outer twister or coiler heads, with two fingers, one on each side of each intermediate twister or coiler head. The inner end of each finger terminates short of the center of the coiling head, and each inner end in the form shown has a curved or rounded face on its under side to facilitate the passage of the sections of the stay-wire with the advance of the twister or coiler heads.

A plurality of under guides or fingers are located on the cross-bar 63 and extend fore and aft of such cross-bar, as shown in Figs. 4 and 5. The arrangement shown has under guides or fingers 72, 73, 74, 75, 76, and 77 with a guide or finger located centrally between the twister or coiler heads, and these guides or fingers furnish a support for the center of the several sections of the stay-wire while being carried toward the twister or coiler heads, and in the arrangement shown each under finger or guide has in its upper face a groove or channel 78 for the passage of the plungers or pushers by which the sections of the stay-wire are carried forward. A plurality of necks 79 depend from the rear cross-bar 63, and each neck 79 has an inwardly-extending plate 80, which is secured at its inner end by bolts or otherwise to a cross bar or plate 81, Fig. 15, attached by bolts to the uprights or standards 5 of the framework. Each neck 79 joins onto a cross-bar 82, extending between the bars 61 and 63, and each cross-bar 82 has secured therein a fixed cutter 83, in which is a hole 84 for the passage of a stay-wire, which hole is in alinement with a hole 85 in the cross-bar 82 and into which hole 85 is entered the upper end of the feed-tube 59 for the stay-wire, so that the stay-wire, as its end is fed forward by the feed-wheels 54 and 56, will be forced through the holes 84 and 85 and across the space between two of the twister or coiler heads.

The advance end of each stay-wire after passing through the hole 84 of its fixed cutter is carried across the space between two adjoining twisters or coiler-heads and when the required length to span the space has been carried across the section is to be severed, so as to furnish a section of the required length to span the space between two adjoining longitudinal strand-wires with a projecting end overlapping the two longitudinal strand-wires sufficiently to furnish a length for coiling the ends together to form a continuous stay and said connected ends twisted or coiled around the longitudinal or strand wire. The sections for the stay-wire are severed from the plurality of stay-wires by revolving cutters in the construction shown. Each cutter 86 is attached by a plate 87 and suitable bolts or screws to a disk 88, each disk having a hub 89, by means of which and a locking screw or bolt 90 the disks are fixedly secured to the shaft 27, so as to revolve with the shaft. The revolving cutters 86 are each set so as to pass in close relation to its companion fixed cutter 83 and sever the section of stay-wire as the revolving cutter passes the fixed cutter, and as the severing must be done quickly the length of the cutting edge of the fixed cutter must be limited, so as not to interfere with the forward feed of the several stay-wires during the act of severing or cutting off the section.

The advance end of each stay-wire for a section of the transverse stay-wire after passing through the hole 84 of the fixed cutter 83 enters a tube 91 and passes into a tube 92 with a space 93 between the two tubes, and the entering end of each tube 91 and 92 has an upwardly-curved point 94, by which the advanced end of the section of the stay-wire will be guided into the tube-section to pass through such section, and each tube-section 91 and 92 has its front side cut away to leave an opening 95, through which the section of the stay-wire can be forced from the tubes 91 and 92.

The sections of the stay-wire are carried forward by a plurality of plungers 96, so arranged that a plunger 96 will engage the center and ends of each stay-wire section. Each plunger 96 has an acting end 97 with a curved under face 98, and a plunger 96 is located in line with an open space 93 of each pair of tubes 91 and 92, which space 93 is in line with the center of each twister or coiler head, and a plunger 96 is located centrally between two twister or coiler heads and in line with the several under fingers or guides, with the acting end entering the groove or channel 78 of the finger or guide, as shown in Figs. 4 and 5, so that the sections of the stay-wire will be caught at its ends and center by the plungers 96 and will be forced out from the tubes 91 and 92 through the opening 95 and will be carried forward after being severed by the revolving cutters and delivered by the advance of the plungers or pushers into position for the ends of each stay-wire section to be caught by the twister or coiler head and twisted or coiled around the longitudinal or strand wires, making, in effect, a continuous transverse stay-wire from the sections or divisions. Each plunger or pusher has at its non-acting or heel end trunnions or journal-pins 99, which enter a groove or channel 100 in a slide-bar 101, having cross-slots 102 at its forward side for the passage of the body of each plunger or pusher 96, and the trunnions or journal-pins are held in the groove or channel 100 by blocks 103 between the rear or non-acting ends of the several plungers or pushers, so as to allow the plungers or pushers to rise on the return movement as the curved face 98 of each plunger or pusher passes oves the advance ends of the stay-wires with the return of the plungers or pushers to normal position for the acting ends to pass back of the stay-wire section. The heel end of each plunger 96 has a head or heel 104, extending from each side of which are the trunnions or journal-pins 99, and each head or heel 104 of the plunger or pusher 96 has a flat face 105, which strikes against the wall 106 of the cross-slot 102 and limits the descent of the acting end 97, so that such end will only fall to a distance that will insure its contact with the stay-wire section at the center and ends in the advance of the plungers or pushers.

At each end of the plate or bar 101 is a dovetail 107, which enters a groove 108 in the upper face of each end bar 62, connecting the bar 101 with the end bars, so that it is free to slide back and forth thereon for receding and advancing the plungers or pushers. The bar 101 has on its upper face a plate 109, secured in place by bolts 110 or otherwise, and adjacent to each end of this plate 109 are ears 111, secured to the plate by flanges 112 and bolts 113 or other fastening means. Each pair of ears 111 carries a cross-pin 114, which passes through the end of a pull-and-push bar 115, located between the ears, and the rear or inner end of the bar 115 is attached by a pin 116 in a slot at the lower end of an arm 117 of a bell-crank lever mounted on a pin 118 between ears 119, bolted or otherwise fastened to the uprights or standards 5 of the framework. The other arm 120 of the bell-crank lever has a cross-pin 121, which carries an ear 122 of a head 123, threaded onto the end of a rod 124, the lower end of which has thereon stop or jam nuts 125, between which is located the head 126 of a stirrup 127, carrying one half or section 128 of the annular rim or ring of an eccentric, the other half or section 129 of which is attached to the half or section 128 by ears 130 and bolts 131, so as to inclose within the complete rim or ring the eccentric 132, fixedly attached to the shaft 16 and revolving with the shaft. The revolving of the eccentric 132 through its rim or ring reciprocates the rod 124 and oscillates the bell-crank lever for the arm 117 of said lever to reciprocate the pull-and-push bar 115, which through its connection with the ears 111 advances and recedes the bar 101, thereby advancing and receding the plungers or pushers to carry the sections of the transverse stay-wire forward and into position for the operation of the twister or coiler heads. The eccentric is so adjusted on the shaft 16 and the length of the throw of the rod 224 is such as to oscillate the arm 117 the distance required to advance and recede the plungers or pushers and furnish the stroke necessary for the advance movement to push the sections of the transverse stay-wire into position over the ends of the twister or coiler heads and to recede the plungers or pushers to normal position back of the sections of the stay-wire.

The gear-wheel 15 has meshing therewith a gear-pinion 133 on the end of a shaft 134, mounted in suitable journal boxes or bearings 135 on the cross bar or rail 4, so that the revolving of the wheel 15 will revolve the shaft. The shaft 134 has fixedly mounted thereon a plurality of bevel-pinions 136, the number of gears corresponding to the number of twister or coiler heads, and each bevel-pinion is attached to the shaft 134 by a hub 137 and a set-screw or bolt 138 or in any other suitable manner so as to revolve with the shaft. Each bevel-pinion 136 has meshing therewith a bevel-pinion 139 of a diameter to cause one revolution of the pinion 136 to revolve the pinion 139 at least one and one-half times. Each pinion 139 has a hub 140, in which is secured the lower end of a sleeve 141 for the sleeve to revolve with the pinion, and the sleeve 141 is mounted in journal boxes or bearings, the half boxes or bearings 142 and 143 of which, as shown, have a connecting-section 144 between them, and the half journal-boxes 142 and 143 each have a flange or ear 145, by means of which and suitable bolts 146 or otherwise the half-boxes are secured to the plate 147, which plate has therein the other half of the journal boxes or bearings for the sleeve. The plate 147 in the arrangement shown extends between the vertical standard or upright 5 and has at its upper edge a flange 148 and at its lower edge a flange 149 for stiffening purposes, and this plate 147 is secured at its end to the standards or uprights 5 by bolts or otherwise. The sleeve 141 has axially located therein a slidable shaft 150, and, as shown, the shaft has a longitudinal groove 151 in its exterior face, and the sleeve has a groove 152 in its inner face, in which grooves is located a ball 153, by means of which the sleeve and shaft are locked together and at the same time the shaft is free to slide endwise in the sleeve without destroying the connection and so that the revolving of the sleeve will revolve the shaft. The upper end of each slidable shaft has secured thereto a twister or coiler head 154, the acting face of which has a cross groove or slot 155 to engage with the ends of the sections of the stay-wire and twist such end or ends around the longitudinal or strand wire. The twister or coiler head has an axial hole 156 for the passage of the longitudinal or strand wire, and this hole is in line with a hole 157 in the slidable shaft, through which hole and the hole 156 the longitudinal or strand wire is free to pass. The lower end of each twister or coiler head in the construction shown, when the head is in normal position and down, abuts against the upper end face of the journal-box for the sleeve, and around the head above the lower end thereof is an annular groove 158, which receives a fork 159 on a plate 160, a fork and plate being provided for each twister or coiler head. The plates 160 are attached by screws 161 to a cross-bar 162, free to slide up and down in guides attached to the uprights or standards 5 of the framework at each end of the bar. Attached to the upper end of the bar, at each end thereof, are ears 163, separated a distance apart, each ear having a flange 164, by means of which and bolts 165 the ears are attached to the bar. The ears at their upper end receive a cap-plate 166, secured in place by bolts 167, and between which and the end of the ears is a cross-pin 168, to which is secured the end of a rock bar or lever 169, entered between the ears. The rock bar or lever 169 is hung on a pivot 170 in the upper end of a swinging arm 171, the lower end of which is mounted on a pin or pivot 172 on an ear 173, attached to the cross bar or rail 7 or otherwise supported on the framework. The inner or rear end of the lever or rock-bar 169 is attached by a pin 174 to a bar 175, the lower end of which is held in a fixed relation by a guide 176, attached to the cross bar or rail 2 of the framework or otherwise supported, and the lower end of each bar 175 has a journal-pin 177, on which is mounted a roller 178, running in contact with the acting face of a cam 179, fixedly mounted on the shaft 16 so as to revolve with the shaft, which face has a depression 180, on each side of which are curved faces 181, terminating in an apex end 182, the contour of the side faces 181 being such that when engaged with the roller 178 the bar 175 will be depressed and lower the rocking arm or lever 169 on the swinging support 171, so as to give a direct up-and-down movement to the plate or bar 162, by which the fork-plates 160 will be raised and lowered, raising and lowering the several twister or coiler heads coincident with the advance of the longitudinal or strand wires as regards the upward movement of the twister or coiler heads, and during such upward movement the ends of the sections of the transverse stay-wire will be twisted around the several longitudinal strand-wires.

The arrangement shown employs six stay-wires, each stay-wire passing through lead-tubes therefor and between the feed-wheels 54 and 56 of the stay-wire, which feed-wheels are adjused so as to have a greater or less impingement to feed the wires with greater or less rapidity, according to the distance to be traversed from one twister or coiler head to the adjoining twister or coiler head, which distances vary, and therefore the rate of speed for the feed of the wires must vary accordingly. The stay-wire 183 has its forward end projected a sufficient distance beyond the fixed cutter therefor to span the space between the first and second twister or coiler heads at the right of the machine with its ends overlapping the twister or coiler heads. The stay-wire 184 has its forward end projected a sufficient distance beyond the fixed cutter therefor to span the space between the second and third twister or coiler heads with its ends overlapping the twister or coiler heads. The stay-wire 185 spans the space between the third and fourth twister or coiler heads when projected at its forward end beyond its fixed cutter. The stay-wire 186 spans the space between the fourth and fifth twister or coiler heads when projected at its forward end beyond its fixed cutter. The stay-wire 187 spans the space between the fifth and sixth twister or coiler heads when projected at its forward end beyond its fixed cutter, and the stay-wire 188 spans the space between the sixth and seventh twister or coiler heads when projected at its forward end beyond its fixed cutter. The severed section of each stay-wire has its ends overlapping the twisters—that is, one end of the section of the stay-wire 183 overlaps the first twister or coiler at the right-hand side of the machine. The adjoining ends of the sections of the stay-wires 183 and 184 overlap the second twister or coiler. The adjoining ends of the sections of the stay-wires 184 and 185 overlap the third twister or coiler. The severed sections of the stay-wires 185 and 186 overlap the fourth twister or coiler. The severed sections of the stay-wires 186 and 187 overlap the fifth twister or coiler. The severed sections of the stay-wires 187 and 188 overlap the sixth twister or coiler, and the severed section of the stay-wire 188 overlaps the seventh twister or coiler. It will thus be seen that the two outer twister or coiler heads have one end only of a section of the transverse stay-wire overlapping its face and that the intermediate twister or coiler heads each have the ends of two adjoining sections of the transverse stay-wire overlapping its acting face. The machine shown employs seven longitudinal or strand wires, each of which passes through the axial center hole of a twister or coiler head and its shaft—that is to say, the strand-wire 189 passes through the first twister at the right hand of the machine, and the strand-wires 190, 191, 192, 193, 194, and 195 pass through the remaining twister or coiler heads. The first section of the transverse stay-wire has one end coiled or twisted around the strand-wire 189, and this first section and the second section of the stay-wire have their crossing ends twisted around the longitudinal or strand wire 190. The crossing ends of the second and the third section are twisted around the longitudinal strand-wire 191. The third and fourth sections have their crossing ends twisted around the longitudinal or strand wire 192. The fourth and fifth sections have their crossing ends twisted around the longitudinal or strand wire 193. The fifth and the sixth sections have their crossing ends twisted around the longitudinal or strand wire 194, and the sixth section has its one end twisted around the longitudinal or strand-wire 195, and when the ends of the several sections of the stay-wire are twisted or coiled around the several longitudinal or strand wires a continuous stay-wire, in effect, is formed attached to all of the longitudinal or strand wires.

The completed fence passes from the twisting or coiling heads to a carrying-cylinder by which the fence is carried forward and the longitudinal or strand wires are advanced with a continuous feed. This carrier is mounted on a shaft 196, supported in suitable journal boxes or bearings 197 on a cross rail or bar 198, extending from the front to the rear standards of the framework. The shaft has rigidly secured thereto two or more spiders 199 with radial lugs 200, to each of which is bolted or otherwise secured one of a pair of straight longitudinal bars 201, and to these bars are secured guiding-jaws 202 for the several longitudinal or strand wires arranged on the bars to suit the distance apart of the longitudinal or strand wires. A series of levers 203 is provided for each series of jaws 202. Each lever 203 is pivotally mounted between the pair of bars 201 so as to turn a limited distance, the pivot passing through all the parts and the outer end of each lever corresponding practically in shape to one of the jaws of the guide and is practically in line with a pair of such jaws. The inner end of each lever has a slot for the passage of a stud or pin connecting the lever with a slide-bar which has a limited end movement. The construction of this carrier and the several parts entering thereinto is fully shown and described in my application Serial No. 222,678, and therefore it is not deemed necessary to describe herein the details of its construction and operation. One end of the carrier has secured to the longitudinal bars a ring-gear 204, which meshes with a pinion 205 on a shaft 206, mounted in suitable journal boxes or bearings on plates 207, attached to cross rails or bars 208 and 209, extending between the front and rear standards of the framework. One end of the shaft 206 has fixed thereon a bevel-pinion 210, which meshes with a bevel-pinion 211 on the end of a shaft 212, supported at its upper end in a journal box or bearing 213 on the plate 207, and the lower end of the shaft is supported in a journal box or bearing 214 on a hanger 215, attached to the cross rail or bar 2 of the framework in the construction shown. The lower end of the shaft has fixed thereon a bevel-pinion 216, which meshes with a bevel-pinion 217 on the end of the shaft 16, so that the revolving of the shaft 16 through the shaft 212 and the bevel-pinions revolves the carrier as required to give a continuous take-up for the fence and a continuous forward feed or advance for the longitudinal or strand wires. The shaft 12 has fixed thereon a pulley-wheel 218, over which runs a belt 219 from a driving-pulley 220 on a shaft 221, on which shaft is a driving-pulley (not shown) by means of which the shaft is revolved from any suitable source of power. The shaft 221 has thereon a sprocket-wheel 222, over which runs a sprocket-chain 223, which drives a sprocket-wheel 224 on a shaft 225, on which shaft is placed a reel-frame of any suitable construction onto which the fence from the carrier is reeled.

It will be seen that the mechanism for feeding forward the stay-wires, the mechanism for severing the stay-wires, the mechanism for carrying forward the sections of the stay-wire to the twister or coiler heads, the mechanism for operating the twister or coiler heads, and the mechanism for taking up the complete fence and feeding forward the longitudinal or strand wires are all operated from the same source of power and that each mechanism has a continuous uninterrupted operation, making the operation for the machine a continuous one as a whole in completing the fence by attaching the transverse stay-wires in sections to the longitudinal or strand wires.

The parts are so timed that the cutting or severing mechanism operates at the time the feeding mechanisms for the stay-wires have advanced or fed forward each stay-wire the required distance to span the space between two adjoining twister or coiler heads, so that the several severed sections of the stay-wire will make when attached to the several longitudinal or strand wires a continuous transverse stay-wire in effect. The mechanism for carrying forward each severed section of the stay-wire commences the advance movement immediately after the stay-wires have been cut off for the several sections of the transverse stay-wire, and this mechanism delivers the sections of the transverse stay-wire over the several twister or coiler heads at the time the twister or coiler heads are in position for the transverse stay-wire sections to enter the grooves in the end faces of the twister or coiler heads to be twisted or coiled around the several longitudinal or strand wires. The mechanism for raising and lowering the twister or coiler heads operates immediately after the stay-wire sections are in positoin over the twister or coiler heads as regards the commencement of the upward movement of the twister or coiler heads, so that during the upward movement the twister or coiler heads will be revolved by the operating mechanism therefor to twist or coil the ends of the transverse stay-wire sections around the several longitudinal or strand wires, such twisting or coiling of the ends occurring and being completed while the twister or coiler heads are making and completing their upward movement. The return movement of the mechanism for carrying forward the sections of the transverse stay-wire occurs while the twister or coiler heads are being raised to perform the twisting or coiling operation, and while the mechanism for carrying forward the stay-wire section is being advanced and returned to normal position the feed mechanism for the stay-wires is operative to advance the stay-wires and bring another portion of each stay-wire into position for severing and have the sections carried forward and delivered to the twister or coiler heads, during which movement the twister or coiler heads have returned to normal position for the entering thereover of the stay-wire sections in position for the next operation of coiling the sections of the next stay-wire around the strand or longitudinal wire. The longitudinal or strand wires are continuously advanced by the carrier, and the upward movement of the twister or coiler heads is coincident with the forward feed or advance of the longitudinal or strand wires, making the operation of twisting or coiling the ends of the stay-wire sections around the longitudinal or strand wires coincident with the forward feed or advance of the longitudinal or strand wires without interrupting such forward feed or advance.

The operation will be understood from the foregoing description, but briefly is as follows: The strand-wires are threaded through their respective twister or coiler heads and the shafts of such heads and their leading ends engaged with the carrier, and the stay-wires are threaded through the tubes and between and through the feed-wheels therefor to the fixed cutters. The machine is started by revolving the shaft 12, which operates the several mechanisms. The stay-wires and the longitudinal or strand wires are fed forward by their feeding mechanisms, and the projected ends of the several stay-wires are severed by the revolving cutters, with the several sections entered into the retaining-tubes 91 and 92 therefor. The plungers or pushers advance, immediately following the severing or cutting off of the sections of the transverse stay-wire, forcing the several sections from the retaining-tubes and carrying the sections forward and delivering the sections in position over the acting ends of the twister or coiler heads for the ends of the sections to be engaged by the grooves of the respective twister or coiler heads. The twister or coiler heads are moved upwardly and simultaneously revolved by the driving mechanism, twisting or coiling the ends of the stay-wire sections around each other and then around the longitudinal or strand wires, completing the attachment of the sectional transverse stay-wire as the terminal of the upward movement of the twister or coiler heads are reached. The twister or coiler heads are then returned to normal position, and during the period of time occupied in the forward and return movement of the twister or coiler heads the stay-wires have been fed forward, the projecting ends severed or cut off for the sections of another transverse stay-wire, the plungers or pushers returned to normal position and advanced again to carry forward and deliver the next succeeding sectional stay-wire, and during the return movement of the twister or coiler heads the forward feed or advance of the longitudinal or strand wires continues, so that when the twister or coiler heads commence their operation on the next succeeding stay-wire the strand wires have been carried forward or advanced the necessary distance for the location of the next succeeding sectional transverse stay-wire. The operations of the several mechanisms are automatic after the machine is once started and will continue so long as the stay-wires are fed forward and the longitudinal or strand wires are fed forward, or until the machine as a whole is stopped by stopping the revolving of the shaft 12 from its source of power. The fence as it is completed after passing over the carrier at the top of the framework is wound on a reel on the shaft 225, as usual, until the reel is full, when the fence on the reel can be severed, the full reel removed, and an empty reel applied to have wound thereon another quantity of the fence.

The leading end portion of each stay-wire which forms a section of the transverse stay-wire crossing the strand-wire after leaving the fixed cutter has a curve or bow between the twister or coiler heads, so that the ends of each transverse stay-wire section are depressed or lower than the center thereof, and the arrangement of the plungers or pushers is one to engage with the center and the ends of the sections of the transverse stay-wire. The rear cross-bar 63 of the frame supporting the upper and lower guide-fingers between which the sections of the transverse stay-wire pass is cut away or depressed at the portions thereof over which the adjoining crossing ends of the transverse stay-wire sections pass to reach their position over the twister or coiler heads, so as to permit a free traverse of the sections of the transverse stay-wire from the retaining-tubes to the point of delivery over the twister or coiler heads, and in such traverse the center of each transverse stay-wire section is supported on the intermediate guide-fingers between the twister or coiler heads, and the crossing ends of the transverse stay-wire sections are held down by the upper guide-fingers, thereby insuring the carrying forward of the transverse stay-wire sections by the forward movement or advance of the plungers or pushers. The bow or curve of transverse stay-wire sections is straightened by the action of the twister or coiler heads in coiling the ends of the transverse stay-wire sections around each other, with the result of having the transverse stay-wires straight and taut between the strand-wires at the completion of the uniting of the sections of the transverse stay-wires to the longitudinal or strand wires

What I claim as new, and desire to secure by Letters Patent, is—

1. In a wire-fence machine, the combination of mechanism for continuously feeding forward a plurality of strand-wires, mechanism for continuously feeding forward a plurality of stay-wires, and mechanism for severing the advance portion of each stay-wire as continuously fed forward to form a section of a transverse stay-wire crossing the plurality of strand-wires, substantially as described.

2. In a wire-fence machine, the combination of mechanism for continuously feeding forward a plurality of strand-wires, mechanism for continuously feeding forward a plurality of stay-wires, mechanism for severing the advance portion of each stay-wire as continuously fed forward to form a section of a transverse stay-wire crossing the plurality of strand-wires, and mechanism for carrying forward and delivering the stay-wire sections into position for coiling their ends around the strand-wires and forming a continuous sectional stay-wire, substantially as described.

3. In a wire-fence machine, the combination of mechanism for continuously feeding forward a plurality of strand-wires, mechanism for continuously feeding forward a plurality of stay-wires, mechanism for severing the advance portion of each stay-wire to form a section of a transverse stay-wire crossing the plurality of strand-wires, mechanism for carrying forward and delivering the stay-wire sections into position for coiling their ends around the strand-wires, and a reciprocating mechanism for coiling the ends of the stay-wire sections around each other and then around the strand-wires as the strand-wires are fed forward, substantially as described.

4. In a wire-fence machine, the combination of mechanism for continuously feeding forward a plurality of strand-wires, mechanism for continuously feeding forward a plurality of stay-wires, a fixed cutter for each stay-wire and through which the stay-wire is guided and held in its passage for the leading end portion of the stay-wire to be projected and furnish a section of a transverse stay-wire crossing the plurality of strand-wires, a revoluble cutter for each fixed cutter the two cutters coöperating to sever the advance portion of the stay-wire projected through the fixed cutter, and means for continuously driving the revoluble cutter, substantially as described.

5. In a wire-fence machine, the combination of mechanism for continuously feeding forward a plurality of strand-wires, mechanism for continuously feeding forward a plurality of stay-wires, mechanism for severing the advance portion of each stay-wire to form a section of a transverse stay-wire crossing the plurality of strand-wires, a plurality of reciprocating plungers engaging the stay-wire sections and carrying the sections forward and delivering the same into position adjacent to the strand-wires, and means for reciprocating the plungers, substantially as described.

6. In a wire-fence machine, the combination of mechanism for continuously feeding forward a plurality of strand-wires, mechanism for continuously feeding forward a plurality of stay-wires, mechanism for severing the advance portion of each stay-wire to form a section of a transverse stay-wire crossing the plurality of strand-wires, mechanism for advancing the sections of the transverse stay-wire into position adjacent to the strand-wires, a plurality of reciprocating coilers operating to coil the ends of the transverse stay-wire sections around each other and then around the strand-wires while the strand-wires are being fed forward, and means for reciprocating the coilers, substantially as described.

7. In a wire-fence machine, the combination of mechanism for continuously feeding forward a plurality of strand-wires, mechanism for continuously feeding forward a plurality of stay-wires, a fixed cutter for each stay-wire and through which the advance end portion of the stay-wire is projected to furnish a section of a transverse stay-wire crossing the strand-wires, a revoluble cutter coöperating with the fixed cutter for severing the stay-wire section from each stay-wire, means for driving the revoluble cutter, a plurality of reciprocating plungers for carrying forward the severed sections of the stay-wire into position adjacent to the strand-wires, means for reciprocating the plungers, a plurality of coilers, one for each strand-wire and encircling its strand-wire and engaging the adjoining crossing ends of the transverse stay-wire sections, and means for advancing the coilers coincident with the advance of the strand-wires, substantially as described.

8. In a wire-fence machine, the combination of mechanism for continuously feeding forward a plurality of strand-wires, mechanism for continuously feeding forward a plurality of stay-wires, a fixed cutter for each stay-wire and through which the advance end portion of the stay-wire is projected to furnish a section of a transverse stay-wire crossing the strand-wires, a revoluble cutter coöperating with the fixed cutter for severing the stay-wire section from each stay-wire, means for driving the revoluble cutter, a plurality of reciprocating plungers for carrying forward the severed sections of the stay-wire into position adjacent to the strand-wires, means for reciprocating the plungers, a plurality of coilers, one for each strand-wire and encircling its strand-wire and engaging the adjoining crossing ends of the transverse stay-wire sections, means for advancing the coilers coincident with the advance of the strand-wires, and means for continuously revolving the coilers while coiling the ends of the stay-wire sections around the strand-wires, substantially as described.

9. In a wire-fence machine, the combination of mechanism for continuously feeding forward a plurality of strand-wires, mechanism for continuously feeding forward a plurality of stay-wires, a fixed cutter for each stay-wire and through which the leading end portion of the stay-wire is projected to furnish a section of a transverse stay-wire crossing the strand-wire, a plurality of revolving cutters one for each fixed cutter, a shaft on which the revolving cutters are fixedly mounted, and a train of gear for driving the shaft from the main power-shaft of the machine, substantially as described.

10. In a wire-fence machine, the combination of mechanism for continuously feeding forward a plurality of strand-wires, mechanism for continuously feeding forward a plurality of stay-wires, mechanism for severing the advance end portion of each stay-wire to form a section of a transverse stay-wire crossing the plurality of strand-wires, a plurality of plungers engaging the severed sections of the transverse stay-wire, a reciprocating bar carrying the plungers, a pull-and-push bar leading from the reciprocating bar, a bell-crank lever having one end of the pull-and-push bar connected thereto, a rod connected with the other end of the bell-crank lever, an eccentric for operating the rod, a shaft on which the eccentric is fixedly mounted, and a driving connection between the shaft and the main power-shaft of the machine, substantially as described.

11. In a wire-fence machine, the combination of mechanism for continuously feeding forward a plurality of strand-wires, mechanism for continuously feeding forward a plurality of stay-wires, mechanism for severing the advance end portion of each stay-wire to form a section of a transverse stay-wire crossing the plurality of strand-wires, mechanism for carrying the stay-wire sections forward to the strand-wires, a plurality of coilers, each coiler having a head and a stem with an axial hole for the passage of a strand-wire, a sleeve encircling the stem and connected therewith, a bevel-gear for each sleeve, a bevel-gear for each bevel-gear of the sleeves, a shaft for the last-named bevel-gears, and a driving connection between the shaft and the main power-shaft of the machine, substantially as described.

12. In a wire-fence machine, the combination of mechanism for continuously feeding forward a plurality of strand-wires, mechanism for continuously feeding forward a plurality of stay-wires, mechanism for severing the advance end portion of each stay-wire to form a section of a transverse stay-wire crossing the plurality of strand-wires, mechanism for carrying the transverse stay-wire sections forward to the strand-wires, a plurality of coilers, each coiler having a head and a stem with an axial hole for the passage of a strand-wire, a sleeve encircling the stem and connected therewith, a fork for each coiler-head, a bar carrying the forks, a rocking lever connected at one end with the bar, a bar connected to the other end of the rocking lever, a roller on the lower end of the last-named bar, a cam engaging the roller, a shaft having the cam fixedly attached thereto, and a driving connection between the shaft and the main power-shaft of the machine, substantially as described.

13. In a wire-fence machine, the combination of mechanism for continuously feeding forward a plurality of strand-wires, mechanism for continuously feeding forward a plurality of stay-wires, mechanism for severing the advance end portion of each stay-wire to form a section of a transverse stay-wire crossing the plurality of strand-wires, mechanism for carrying the transverse stay-wire sections forward to the strand-wires, a plurality of coilers, each coiler having a head and a stem with an axial hole for the passage of a strand-wire, a sleeve encircling the stem and connected therewith, a bevel-gear for each sleeve, a bevel-gear for each bevel-gear of the sleeves, a shaft for the last-named bevel-gears, a driving connection between the shaft and the main power-shaft of the machine, a fork for each coiler-head, a bar carrying the forks, a rocking lever connected at one end with the bar, a bar connected to the other end of the rocking lever, a roller on the lower end of the last-named bar, a cam engaging the roller, a shaft having the cam fixedly attached thereto, and a driving connection between the shaft and the main power-shaft of the machine, substantially as described.

14. In a wire-fence machine, the combination of a plurality of fixed cutters, through each of which a transverse stay-wire passes and is guided and held in its passage, a revolving cutter for each fixed cutter and coöperating therewith to sever the portion of the stay-wire projected through the fixed cutter and form a stay-wire section, and means for continuously driving the revolving cutters, substantially as described.

15. In a wire-fence machine, the combination of a plurality of fixed cutters through each of which a section of a transverse stay-wire passes, a revolving cutter for each fixed cutter and coöperating therewith to sever the projected portion and form a stay-wire section, means for continuously driving the revolving cutters, and a divided retaining-tube between each of the fixed cutters and into which the section of the stay-wire is entered, each retaining-tube open on its delivery side, substantially as described.

16. In a wire-fence machine, the combination of a plurality of fixed cutters, a plurality of revoluble cutters one for each fixed cutter for severing the sections of a transverse stay-wire crossing the strand-wires, a retaining-tube between the fixed cutters and into which the severed section of the transverse stay-wire sections is entered, each tube open on its delivery side, and a plurality of reciprocating plungers for forcing the stay-wire sections from the retaining-tubes and carrying the sections forward, substantially as described.

17. In a wire-fence machine, the combination of a plurality of fixed cutters, a plurality of revoluble cutters one for each fixed cutter for severing the sections of a transverse stay-wire crossing the strand-wires, a retaining-tube between the fixed cutters and into which the severed section of the transverse stay-wire sections is entered, each tube open on its delivery side, a plurality of reciprocating plungers for forcing the stay-wire sections from the receiving-tubes and carrying the sections forward, a bar common to all of the plungers, a pull-and-push bar for each end of the plunger-bar, a bell-crank lever for each pull-and-push bar, a rod for each bell-crank lever, an eccentric for each rod, a shaft having the eccentrics fixedly mounted thereon, and means for revolving the shaft, substantially as described.

18. In a wire-fence machine, the combination of a plurality of fixed cutters through each of which a stay-wire passes, a revolving cutter for each fixed cutter and coöperating therewith to sever the leading end portion of the stay-wire and form a transverse stay-wire section, means for continuously driving the revolving cutters, a divided retaining-tube between each of the fixed cutters and into which the section of the stay-wire is entered, each retaining-tube open on its delivery side, a plurality of upper guide-fingers, a plurality of lower guide-fingers between which and by which fingers the sections of the transverse stay-wire are held and guided while being carried forward, substantially as described.

19. In a wire-fence machine, the combination of a plurality of fixed cutters through each of which a transverse stay-wire passes, a revolving cutter for each fixed cutter and coöperating therewith to sever the leading end portion of the stay-wire and form a transverse stay-wire section, means for continuously driving the revolving cutters, a divided retaining-tube between each of the fixed cutters and into which the section of the transverse stay-wire is entered, each retaining-tube open on its delivery side, a plurality of upper guide-fingers, a plurality of lower guide-fingers between which and by which fingers the sections of the transverse stay-wire are held and guided while being carried forward, a plurality of reciprocating plungers for forcing the sections of the transverse stay-wire from the retaining-tubes and carrying the sections forward between the fingers, and means for reciprocating the plungers, substantially as described.

20. In a wire-fence machine, the combination of a series of upper and lower fingers for guiding the sections of a transverse stay-wire, and a plurality of plungers engaging the sections of the transverse stay-wire and carrying the sections forward between the fingers, substantially as described.

21. In a wire-fence machine, the combination of a series of upper and lower fingers for guiding the sections of a transverse stay-wire, a plurality of plungers engaging the sections of the transverse stay-wire and carrying the sections forward between the fingers, a bar common to all the plungers, a pull-and-push bar at each end of the plunger-bar, a bell-crank lever for each pull-and-push bar, a rod for each bell-crank lever, an eccentric for each rod, a shaft having the eccentric fixedly mounted thereon, and means for revolving the shaft, substantially as described.

22. In a wire-fence machine, the combination of a plurality of fixed cutters through each of which a stay-wire passes, a revolving cutter for each fixed cutter and coöperating therewith to sever the leading end portion of the stay-wire and form a transverse stay-wire section, means for continuously driving the revoluble cutter, a divided retaining-tube between each of the fixed cutters and into which the section of the transverse stay-wire is entered, each retaining-tube open on its delivery side, a plurality of upper guide-fingers with the intermediate ones arranged in pairs on opposite sides of a twister or coiler head, a plurality of lower guide-fingers one intermediate of each two twister-heads and between which and by which and the upper guide-fingers the sections of the transverse stay-wire are held and guided while being carried forward, substantially as described.

23. In a wire-fence machine, the combination of a plurality of fixed divided tubes receiving thereinto the sections of a transverse stay-wire, a series of upper guide-fingers, a series of lower guide-fingers, and a plurality of reciprocating plungers for forcing the sections of the transverse stay-wire from the retaining-tubes and carrying the sections forward between the guide-fingers, substantially as described.

24. In a wire-fence machine, the combination of a plurality of fixed divided tubes receiving thereinto the sections of a transverse stay-wire, a series of upper guide-fingers, a series of lower guide-fingers, a plurality of reciprocating plungers for forcing the sections of the stay-wire from the restraining-tubes and carrying the sections forward between the guide-fingers, and a plurality of coiler-heads over which the sections of the transverse stay-wire are delivered by the plungers, substantially as described.

25. In a wire-fence machine, the combination of mechanism for continuously feeding forward a plurality of strand-wires, a plurality of coiler-heads, one coiler-head for each strand-wire, means for continuously revolving the coiler-heads, and means for reciprocating the coiler-heads to have a forward movement coincident with the forward travel of the strand-wires, substantially as described.

26. In a wire-fence machine, the combination of mechanism for continuously feeding forward a plurality of strand-wires, a plurality of coiler-heads, one head for each strand-wire, a shaft for each coiler-head through which and the coiler-head the strand-wire passes, a sleeve encircling the shaft, a connection between the shaft and the sleeve permitting endwise movement of the shaft, and means for continuously revolving the sleeve and thereby revolving the shaft and coiler-head continuously, substantially as described.

27. In a wire-fence machine, the combination of mechanism for continuously feeding forward a plurality of strand-wires, a plurality of coiler-heads, one head for each strand-wire, a shaft for each coiler-head through which and the coiler-head the strand-wire passes, a sleeve encircling the shaft, a connection between the shaft and the sleeve permitting endwise movement of the shaft, means for continuously revolving the sleeve and thereby revolving the shaft and coiler-head continuously, and means for reciprocating the coiler-heads and the shaft for the coiler-heads in one direction of travel to move coincident with the forward travel of the strand-wires, substantially as described.

28. In a wire-fence machine, the combination of mechanism for severing the section of a continuously-advanced transverse stay-wire, mechanism for carrying forward the severed sections of the transverse stay-wires and mechanism for coiling the ends of the stay-wire section around continuously-fed strand-wires, said mechanism employing a plurality of reciprocating and continuously-revolving coiler-heads, substantially as described.

29. In a fence-wire machine, the combination of mechanism for severing the sections of a continuously-advanced transverse stay-wire, means for retaining the sections in a fixed position after being severed, means for guiding and directing the severed sections from their retained position, and means for carrying forward the severed sections from the retaining means and across the guiding means to a position for coiling the ends of the sections around the strand-wires, substantially as described.

30. In a wire-fence machine, the combination of mechanism for severing the sections of a continuously-advanced transverse stay-wire, means for retaining the sections in a fixed position after being severed, means for guiding and directing the severed sections from their retained position, means for carrying forward the severed sections from the retaining means and across the guiding means to a position for coiling the ends of the sections around the strand-wires, and a plurality of continuously-revolving and reciprocating coiler-heads for engaging the ends of the sections of the transverse stay-wire and coiling the ends around the strand-wires, substantially as described.

31. In a wire-fence machine, the combination of a carrier for the completed fence and for continuously feeding forward a plurality of strand-wires, a plurality of feed-wheels for continuously feeding forward a plurality of stay-wires, and a mechanism for severing a portion of the projected end of each stay-wire as the stay-wire is continuously advanced to form a section of a transverse stay-wire crossing the plurality of strand-wires, substantially as described.

32. In a wire-fence machine, the combination of a carrier for the completed fence and for continuously feeding forward a plurality of strand-wires, a plurality of feed-wheels for continuously feeding forward a plurality of stay-wires, a fixed cutter for each stay-wire and through which the stay-wire passes and is guided and held for the advance end of the stay-wire when projected to furnish a section of a transverse stay-wire crossing the strand-wire, a revoluble cutter coöperating with the fixed cutter for severing the projected portions of the stay-wires forming the stay-wire sections from each stay-wire, and means for driving the revoluble cutters, substantially as described.

33. In a wire-fence machine, the combination of a carrier for the completed fence and for continuously feeding forward a plurality of strand-wires, a plurality of feed-wheels for continuously feeding forward a plurality of stay-wires, mechanism for severing as continuously fed forward the leading end portion of each stay-wire to form a section of a transverse stay-wire crossing the plurality of strand-wires, means for carrying forward the severed sections of the transverse stay-wire and mechanism for coiling the ends of the stay-wire sections around the strand-wires as the strand-wires continuously advance, substantially as described.

34. In a wire-fence machine, the combination of a carrier for the completed fence and for continuously feeding forward a plurality of strand-wires, a plurality of feed-wheels for continuously feeding forward a plurality of stay-wires, mechanism for severing the leading end portion of each stay-wire to form a section of a transverse stay-wire crossing the plurality of strand-wires, a fixed retaining-tube for each severed section of the transverse stay-wire, guide-fingers between which the severed sections of the transverse stay-wire are carried, and reciprocating plungers for carrying forward the sections of the transverse stay-wire between the guide-fingers, substantially as described.

35. In a wire-fence machine, the combination of a carrier for the completed fence and for continuously feeding forward a plurality of strand-wires, a plurality of feed-wheels for continuously feeding forward a plurality of stay-wires, mechanism for severing the leading end portion of each stay-wire to form a section of a transverse stay-wire crossing the plurality of strand-wires, a fixed retaining-tube for each severed section of the transverse stay-wire, guide-fingers between which the severed sections of the transverse stay-wire are carried, reciprocating plungers for carrying forward the sections of the transverse stay-wire between the guide-fingers, and a plurality of coilers over the acting ends of which the sections of the stay-wires are delivered for the coilers to engage the ends of the stay-wire sections and coil the same around the strand-wires, substantially as described.

36. In a wire-fence machine, the combination of a carrier for the completed fence and for continuously feeding forward a plurality of strand-wires, a plurality of feed-wheels for continuously feeding forward a plurality of stay-wires, mechanism for severing the leading end portion of each stay-wire to form a section of a transverse stay-wire crossing the plurality of strand-wires, a fixed retaining-tube for each severed section of the transverse stay-wire, guide-fingers between which the severed sections of the transverse stay-wire are carried, reciprocating plungers for carrying forward the sections of the transverse stay-wire between the guide-fingers, a plurality of coiler-heads over the acting ends of which the sections of the stay-wire are delivered for coiling the ends of the same around the strand-wires, means for reciprocating the coiler-heads, and means for revolving the coiler-heads, substantially as described.

JOSEPH M. DENNING.

Witnesses:
THOMAS A. BANNING,
WALKER BANNING.